United States Patent
Sobue

(10) Patent No.: US 7,688,342 B2
(45) Date of Patent: Mar. 30, 2010

(54) IMAGE FORMING APPARATUS AND CONTROL METHOD THEREOF

(75) Inventor: Fumitaka Sobue, Toride (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/696,173

(22) Filed: Apr. 3, 2007

(65) Prior Publication Data

US 2007/0242315 A1 Oct. 18, 2007

(30) Foreign Application Priority Data

Apr. 12, 2006 (JP) ............................. 2006-110103

(51) Int. Cl.
B41J 27/00 (2006.01)
G02B 26/08 (2006.01)

(52) U.S. Cl. ................. 347/261; 359/200.1; 359/203.1; 359/212.2; 359/217.1

(58) Field of Classification Search ........................ None
See application file for complete search history.

(56) References Cited

U.S. PATENT DOCUMENTS

| | | | |
|---|---|---|---|
| 4,600,837 A * | 7/1986 | DiStefano et al. ........... 250/235 |
| 5,627,670 A | 5/1997 | Minoura et al. |
| 5,812,299 A | 9/1998 | Minakuchi et al. |
| 5,892,219 A * | 4/1999 | Minakuchi et al. .......... 250/205 |
| 6,243,123 B1 | 6/2001 | Tanimoto et al. |
| 6,476,370 B1 | 11/2002 | Suzuki et al. |
| 6,483,529 B1 | 11/2002 | Ito et al. |
| 6,646,668 B2 | 11/2003 | Tanimoto et al. |
| 6,844,892 B2 | 1/2005 | Iima et al. |
| 2004/0141051 A1* | 7/2004 | Tsuruya ....................... 347/239 |
| 2004/0145644 A1* | 7/2004 | Makino ....................... 347/233 |
| 2006/0285186 A1* | 12/2006 | Ishida et al. ................. 359/204 |

| | | |
|---|---|---|
| 2008/0018727 A1 | 1/2008 | Ishikawa et al. |

FOREIGN PATENT DOCUMENTS

| | | |
|---|---|---|
| EP | 0 827 326 A2 | 3/1998 |
| JP | 63-050809 A | 3/1988 |
| JP | 3-64729 A | 3/1991 |

(Continued)

OTHER PUBLICATIONS

Search Report issued in the corresponding European application No. 07105750.9-2304 mailed Aug. 14, 2007.

(Continued)

*Primary Examiner*—Matthew Luu
*Assistant Examiner*—Kendrick X Liu
(74) *Attorney, Agent, or Firm*—Rossi, Kimms & McDowell LLP

(57) ABSTRACT

An image forming apparatus includes a photosensitive member, a light source for which intervals between spots formed on the photosensitive member by respective beams emitted from a plurality of light-emitting portions are narrower than a predetermined resolution, and a rotating polygonal mirror having a plurality of mirror plane each of which deflects beams emitted from the light source while rotating. In particular, the image forming apparatus includes a selection unit which selects a light-emitting portion corresponding to a mirror plane used to deflect a beam from the light source, and a driving unit which drives the light source to emit a beam from the selected light-emitting portion.

12 Claims, 15 Drawing Sheets

FOREIGN PATENT DOCUMENTS

| | | |
|---|---|---|
| JP | 3-255295 A | 11/1991 |
| JP | 05-096781 A | 4/1993 |
| JP | 5-208523 A | 8/1993 |
| JP | 7-012709 A | 1/1995 |
| JP | 9-159948 A | 6/1997 |
| JP | 3255295 B2 | 11/2001 |
| JP | 2005-234510 A | 9/2005 |
| JP | 2006-35703 A | 2/2006 |

OTHER PUBLICATIONS

Related co-pending U.S. Appl. No. 11/696,175; Fumitaka Sobue et al.; "Image Forming Apparatus, Optical Scanning Apparatus, and Auto Light Power Control Method", filed Apr. 3, 2007; Spec. pp. 1-36; Figs. 1-16.

Extended EP search report, dated Mar. 6, 2008, corresponding with related co-pending USPG 2007-0242128.

* cited by examiner

FIG. 8

| PLANE IDENTIFICATION SIGNAL / ADDRESS SIGNAL | SELECTION SIGNAL |
| --- | --- |
| 000 (MIRROR PLANE A) | 00100 (LIGHT-EMITTING PORTION 403) |
| 001 (MIRROR PLANE B) | 01000 (LIGHT-EMITTING PORTION 404) |
| 010 (MIRROR PLANE C) | 00010 (LIGHT-EMITTING PORTION 402) |
| 011 (MIRROR PLANE D) | 10000 (LIGHT-EMITTING PORTION 405) |
| 100 (MIRROR PLANE E) | 00100 (LIGHT-EMITTING PORTION 403) |
| 101 (MIRROR PLANE F) | 01000 (LIGHT-EMITTING PORTION 404) |

FIG. 13

| AMOUNT OF PLANE TILT (PIXEL) | SELECTION SIGNAL |
|---|---|
| +1/2 | 10000 (LIGHT-EMITTING PORTION 405) |
| +1/4 | 01000 (LIGHT-EMITTING PORTION 404) |
| 0 | 00100 (LIGHT-EMITTING PORTION 403) |
| −1/4 | 00010 (LIGHT-EMITTING PORTION 402) |
| −1/2 | 00001 (LIGHT-EMITTING PORTION 401) |

IMAGE FORMING APPARATUS AND CONTROL METHOD THEREOF

BACKGROUND OF THE INVENTION

1. Field of the Invention

The present invention relates to an image forming apparatus that performs light exposure using a light source that has a plurality of light-emitting portions.

2. Description of the Related Art

In general, an image forming apparatus according to an electrophotographic system scans a photosensitive member by reflecting a beam that is emitted from a laser diode using a polygonal mirror that is rotationally driven. Each plane of the polygonal mirror is a mirror, and laser lights are respectively reflected on each plane to draw lines (scanning lines) on the photosensitive member. At this time, if the tilt of each plane with respect to the rotational axis is equal, the line pitch of lines drawn by each plane will be constant.

However, due to variations in the accuracy of finishing, the tilt of each plane with respect to the rotational axis do not match exactly. Consequently, variations arise in the line pitches drawn by each plane in a cycle according to the number of planes of the polygonal mirror. As a result, for example, even when using image data which comprises a plurality of equidistant horizontal lines, the pitch of each horizontal line in the formed image will not match.

Technology which corrects this kind of pitch nonuniformity in the sub-scanning direction has already been proposed. Japanese Patent Laid-Open No. 2005-234510 proposes technology which, by varying the light power rate between a principal light source and a secondary light source corresponding to two adjacent lines, corrects pixel error in the sub-scanning direction with a high degree of accuracy.

Japanese Patent Laid-Open No. 63-050809, Japanese Patent Laid-Open No. 5-208523 and Japanese Patent Laid-Open No. 9-159948 also propose technologies that change an optical path in a direction which cancels a plane tilt using a prism that is provided between the end face of a laser and a polygonal mirror.

However, according to the technology disclosed in Japanese Patent Laid-Open No. 2005-234510, a spot produced by a beam from the primary light source and a spot produced by a beam from the secondary light source do not match on the photosensitive member. More specifically, the shape of the spots is that of FIG. 8. Therefore, the size of a dot that is formed by the technology disclosed in Japanese Patent Laid-Open No. 2005-234510 is larger than the size of a dot formed by a single light source. Hence, according to the technology disclosed in Japanese Patent Laid-Open No. 2005-234510, it is difficult to form a high definition image or to enhance the reproducibility of dots one by one to form a sharper latent image.

Further, the respective technologies disclosed in Japanese Patent Laid-Open No. 63-050809, Japanese Patent Laid-Open No. 5-208523 and Japanese Patent Laid-Open No. 9-159948 require an additional optical component such as a prism and a drive circuit to accompany that optical component, and therefore production costs are liable to rise and the adjustment time at assembly is also liable to increase.

SUMMARY OF THE INVENTION

A feature of the present invention is to solve at least one problem among the problems described above and other problems. In this connection, other problems will be understood upon reading through this entire specification.

The present invention can be favorably realized by, for example, an image forming apparatus comprising a photosensitive member, a light source for which intervals between spots formed on the photosensitive member by respective beams emitted from a plurality of light-emitting portions are narrower than a predetermined resolution, and a rotating polygonal mirror which deflects beams emitted from the light source while rotating.

In particular, the image forming apparatus comprises a selection unit which selects a light-emitting portion corresponding to a mirror plane that is to be used to deflect a beam from a light source, and a driving unit which drives a light source so as to emit a beam from the selected light-emitting portion.

Further features of the present invention will become apparent from the following description of exemplary embodiments (with reference to the attached drawings).

BRIEF DESCRIPTION OF THE DRAWINGS

FIG. 8 is a view which illustrates one example of a storage unit according to the embodiments;

FIG. 13 is a view which illustrates the correlation between amounts of plane tilt and selection signals according to the embodiments;

DESCRIPTION OF THE EMBODIMENTS

Embodiments of the present invention are described hereunder. Naturally, the individual embodiments described hereunder are useful in understanding various concepts of the present invention such as a superordinate concept, an intermediate concept, and a subordinate concept. Note that the technical scope of the present invention is defined by the patent claims, and is not limited by the individual embodiments described hereunder.

First Embodiment

Figure 1:
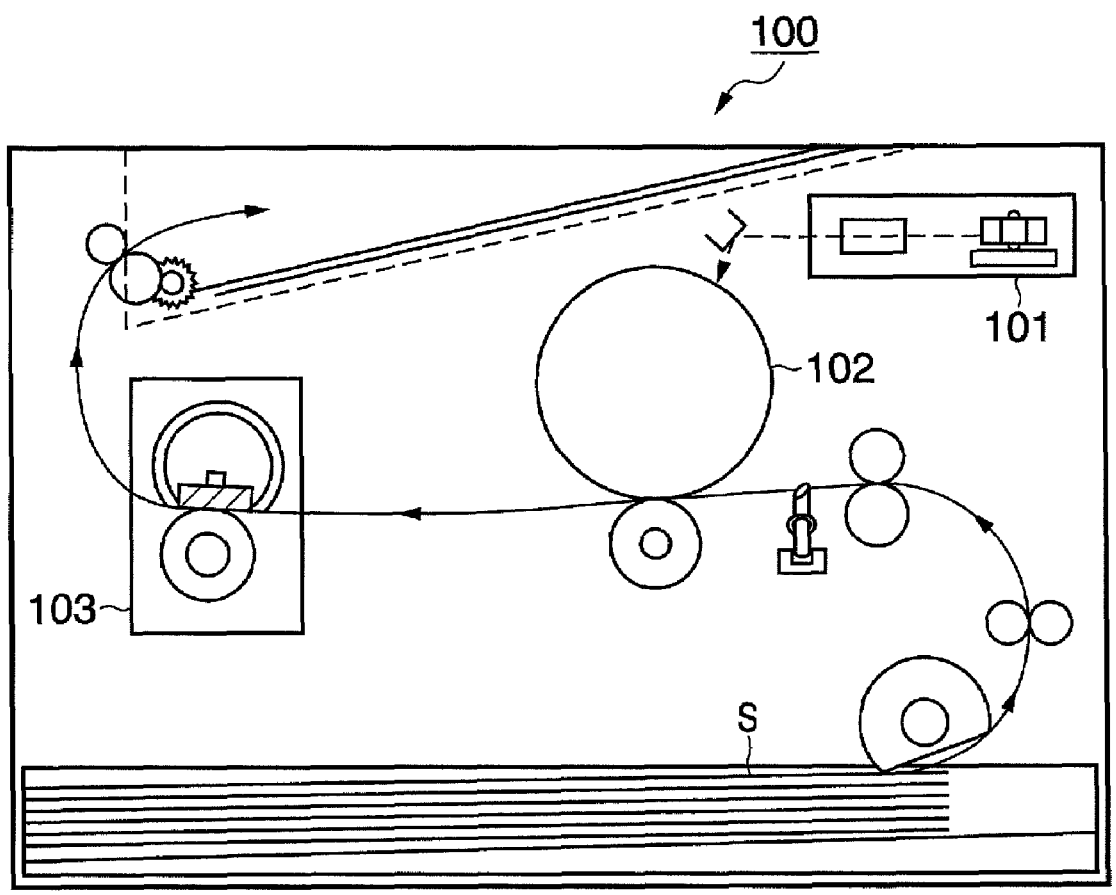
FIG. 1 is a schematic cross section of an image forming apparatus according to the embodiments.

FIG. 1 is a schematic cross section of an image forming apparatus according to the embodiments. An image forming apparatus 100 is an apparatus which forms monochrome or multi-color images. For example, the image forming apparatus 100 is implemented as a printing apparatus, an image outputting apparatus, a printer, a copier, a multifunction peripheral or a facsimile machine.

An optical scanning apparatus (exposure apparatus) 101 is an apparatus which scans a light beam onto a uniformly charged drum-like photosensitive member 102. Thereby, an electrostatic latent image corresponding to an image signal is formed on the photosensitive member 102 that is photosensitive. The electrostatic latent image is converted/visualized into a developer (for example, toner) image by a developing apparatus. A fixing apparatus 103 fixes the developer image to a recording medium S onto which the developer image was transferred from the photosensitive member 102. The recording medium S may also be referred to as a paper, a sheet, a transfer material, printing material, printing medium or the like.

Figure 2:
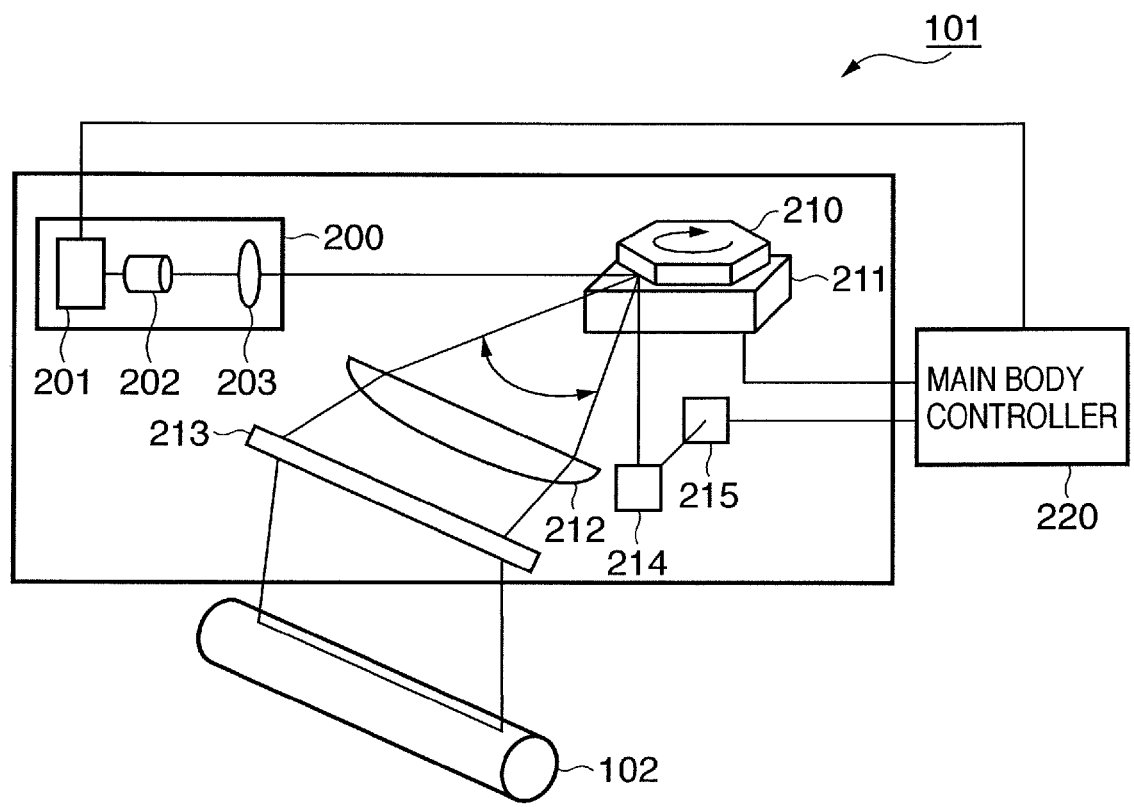
FIG. 2 is a view which illustrates one example of an exposure apparatus according to the embodiments.

FIG. 2 is a view which illustrates one example of the optical scanning apparatus according to this embodiment. The optical scanning apparatus 101 has a laser unit 200, a rotating polygonal mirror (polygonal mirror) 210, a polygonal motor 211, an fθ lens 212, a returning mirror 213, a reflecting mirror 214 and a beam detecting sensor 215. The optical scanning apparatus 101 also has a half mirror 216 and a light receiving device 217 for detecting the light power of a beam. The light receiving device 217 is, for example, a sensor such as a photodiode.

The laser unit 200 has a laser drive unit 201, a semiconductor laser 202 and a collimator lens 203. The semiconductor laser 202 is a light source package that emits laser light when it is driven by the laser drive unit 201. The laser light may also be referred to as a "beam". The collimator lens 203 is an optical component which converts a laser light that is emitted from the semiconductor laser 202 into a predetermined beam diameter. The laser drive unit 201 is controlled by a main body controller 220. The main body controller 220 includes a CPU, a ROM and a RAM, and executes various controls relating to the image forming process.

The polygonal mirror 210 is a rotating polygonal mirror which deflects a laser light of a predetermined beam diameter while rotating. The polygonal mirror 210 comprises a plurality of mirror planes (these may also be referred to as "scanning mirror planes/surfaces" or "reflecting planes/surfaces"). The polygonal motor 211 is a motor for rotating the polygonal mirror 210. The fθ lens 212 is an optical component for focusing a laser light that is reflected by the polygonal mirror 210. The returning mirror 213 is an optical component for guiding a laser light that passes through the fθ lens 212 onto the plane of the photosensitive member 102.

The reflecting mirror 214 is an optical component for guiding a laser light to the beam detecting sensor 215. The beam detecting (BD) sensor 215 detects a laser light that is reflected by the reflecting mirror 214, and outputs a beam detection signal (BD signal) to the main body controller 220. A beam detection signal is output for each line in the main scanning direction.

The main body controller 220 detects a cycle in which a beam detection signal is output, and controls the rotation of the polygonal mirror by outputting acceleration signals or deceleration signals to the polygonal motor 211 so that that cycle becomes a predetermined cycle. The polygonal motor 211 drives the polygonal mirror 210 based on the control of the main body controller 220.

Figure 3:
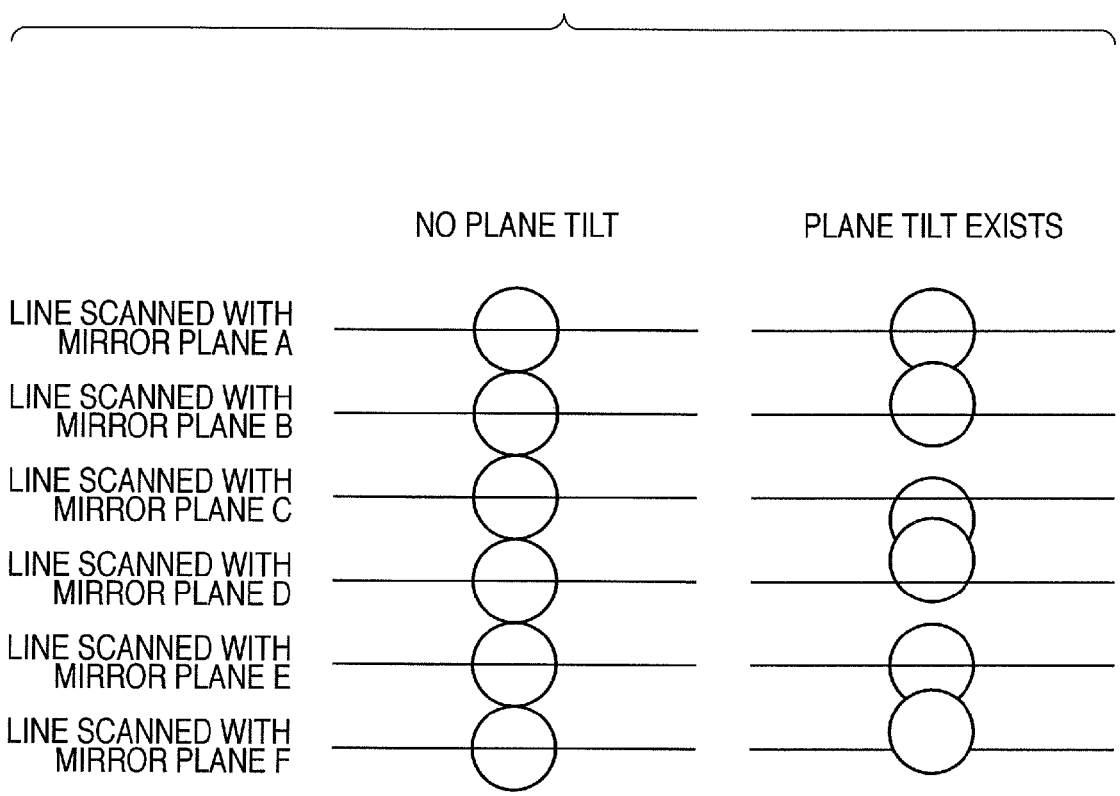
FIG. 3 is a view which illustrates the irradiated positions of laser lights in a case where there is no plane tilt, and the irradiated positions of laser lights in a case where there is a plane tilt.

FIG. 3 is a view which illustrates the irradiated positions (spot positions) of laser lights in a case where there is no plane tilt, and the irradiated positions of laser lights in a case where there is a plane tilt. In this example, it is assumed that the polygonal mirror has six mirror planes (A to F). Each straight line in the figure represents the ideal irradiated position of each mirror plane. The plane tilt may also be referred to as "plane tilt shift" or "plane tilt error".

As will be understood from the figure, at ideal laser irradiated positions of the polygonal mirror at which a plane tilt does not exist or at which a plane tilt can be ignored, the intervals between lines that are formed by each mirror plane are constant.

In contrast, at general laser irradiated positions of the polygonal mirror at which a plane tilt exists or at which a plane tilt cannot be ignored, the intervals between lines that are formed by each mirror plane are not constant. Although according to the figure the plane A and the plane E are not plane tilted with respect to the rotational axis of the polygonal mirror, it is found that the other mirror planes all incline away from the rotational axis. Naturally, the interval (sub-scanning pitch interval) between each line in the sub-scanning direction will not be uniform. Hence, it is necessary to reduce the pitch nonuniformity by selecting a light-emitting portion(s) that is suitable for the current mirror plane that is to be used to deflect a beam from the light source from among the plurality of mirror planes.

Figure 4:
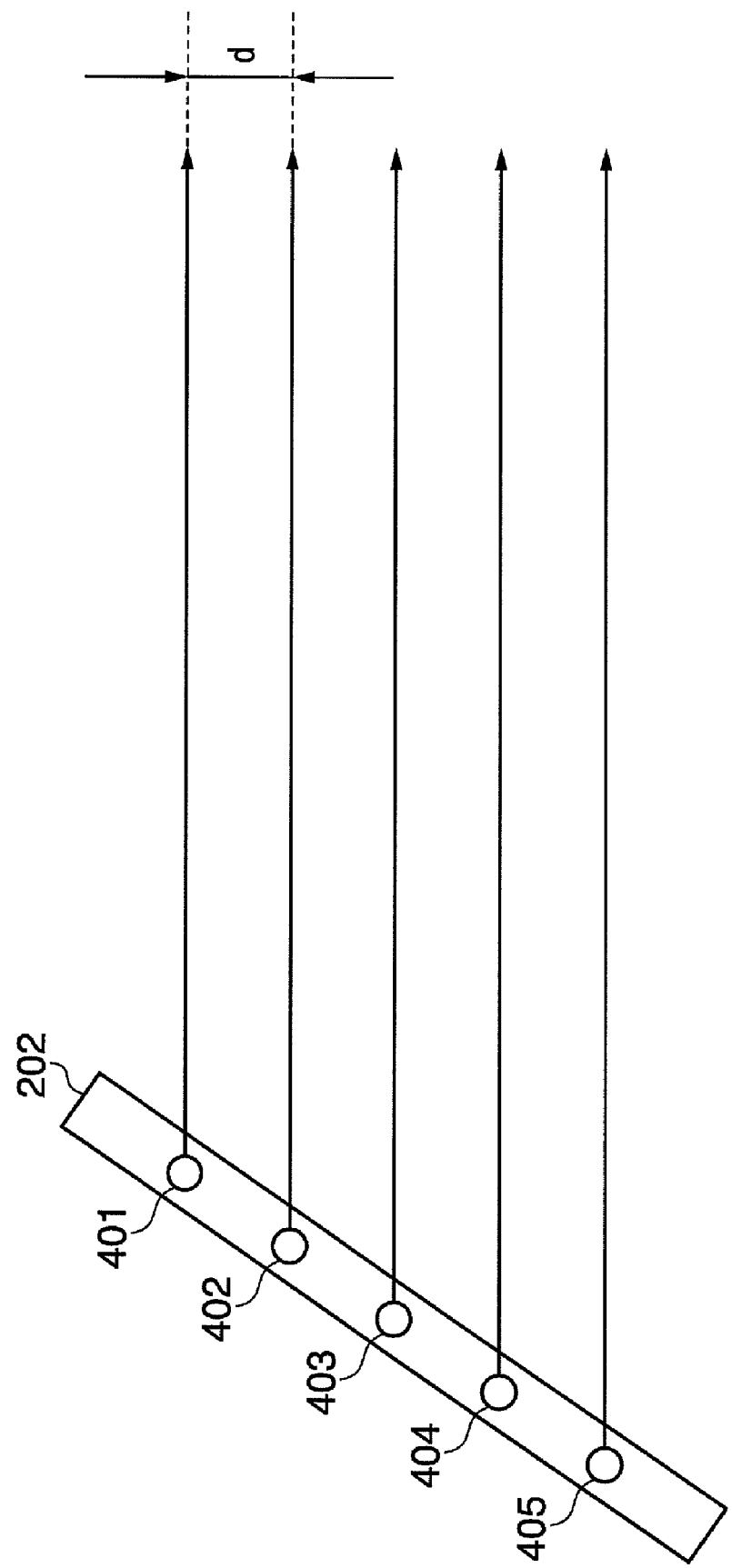
FIG. 4 is a view which illustrates one example of a semiconductor laser according to the embodiments.

FIG. 4 is a view which illustrates one example of a semiconductor laser according to this embodiment. The semiconductor laser 202 according to the present embodiment has a plurality of light-emitting portions 401 to 405. Naturally, each light-emitting portion is a single semiconductor laser. The respective beams emitted from the plurality of light-emitting portions 401 to 405 form respective spots on the photosensitive member 102. According to the present embodiment, the light-emitting portions 401 to 405 are disposed such that an interval "d" between the spots of the light-emitting portions is narrower than the resolution of the image forming apparatus 100. Further, it is assumed that each light-emitting portion forms one line, respectively. As described above, when attempting to form a single line by using a plurality of light-emitting portions at the same time, there is a possibility that the spot diameter will widen and the reproducibility of dots will deteriorate. Therefore, according to the present embodiment a plurality of light-emitting portions are not made to light at the same time.

Figure 5:
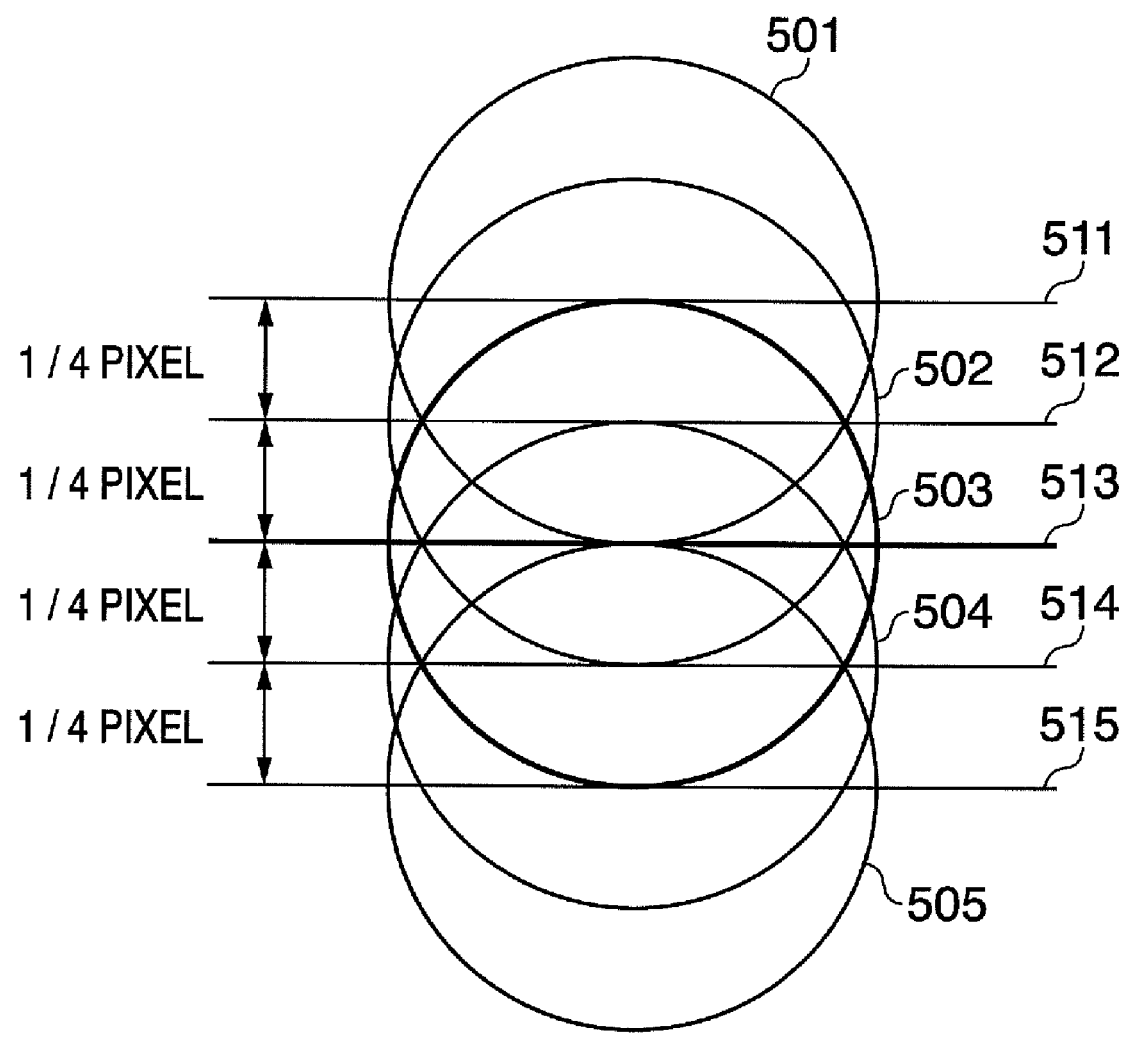
FIG. 5 is a view which illustrates the relation between spots and each light-emitting portion of a semiconductor laser according to the embodiments.

FIG. 5 is a view which illustrates the relation between spots and each light-emitting portion of the semiconductor laser according to this embodiment. Spots 501 to 505 correspond to the light-emitting portions 401 to 405, respectively. Straight lines 511 to 515 represent scanning lines that are formed by the light-emitting portions 401 to 405, respectively. As will be understood from the figure, the intervals "d" between each spot are ¼ of a pixel, respectively. It is therefore possible according to the present embodiment to reduce the amount of plane tilt according to the following range: +½ pixel, +¼ pixel, −¼ pixel and −½ pixel.

According to FIG. 3, the amount of plane tilt of the mirror plane A is ±0 pixels (the upward direction is taken as the + direction). Hence, it is sufficient that, with respect to the mirror plane A, the laser drive unit 201 causes the light-emitting portion 403 to emit laser light. Since the amount of plane tilt of the mirror plane B is +¼ pixel, if the laser drive unit 201 causes the light-emitting portion 404 to emit laser light, the amount of plane tilt can be reduced. Since the amount of plane tilt of the mirror plane C is −¼ pixel, it is sufficient for the laser drive unit 201 to cause the light-emitting portion 402 to emit laser light. Since the amount of plane tilt of the mirror plane D is +½ pixel, it is sufficient for the laser drive unit 201 to cause the light-emitting portion 405 to emit laser light. Since the amount of plane tilt of the mirror plane E is ±0 pixels, it is sufficient for the laser drive unit 201 to cause the light-emitting portion 403 to emit laser light. Since the amount of plane tilt in the case of the mirror plane F is +¼ pixel, it is sufficient for the laser drive unit 201 to cause the light-emitting portion 404 to emit laser light. If the amount of plane tilt of any of the mirror planes is +½ pixel, naturally it will be sufficient for the laser drive unit 201 to cause the light-emitting portion 405 to emit laser light.

By selecting a light-emitting portion that is suitable for reducing the amount of plane tilt in this manner, it is possible to form an image in which the pitch of lines in the sub-scanning direction is constant. In this connection, since the number of light-emitting portions with respect to one line is five according to the present embodiment, pitch nonuniformity can be corrected within the range of ±½ pixel, and naturally, the correction accuracy and the correction range can be increased by further increasing the number of lasers.

Figure 6:
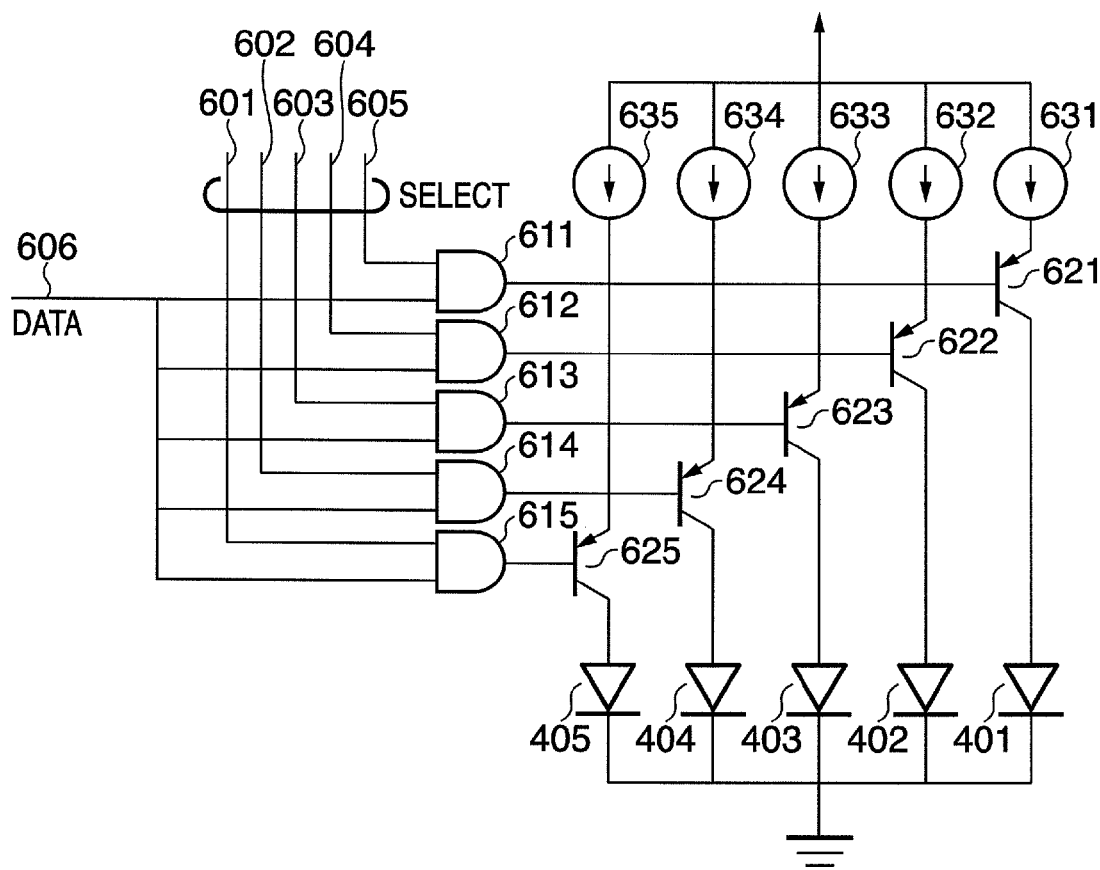
FIG. 6 is a circuit diagram which illustrates one example of a laser drive unit according to the embodiments.

FIG. 6 is a circuit diagram which illustrates one example of a laser drive unit according to this embodiment. According to the present embodiment, selection signals (SELECT) 601 to 605 of five bits are used for alternatively selecting the five light-emitting portions. For example, if the selection signal is "00001", the light-emitting portion 401 is selected. If the selection signal is "00010", the light-emitting portion 402 is selected. If the selection signal is "00100", the light-emitting portion 403 is selected. If the selection signal is "01000", the light-emitting portion 404 is selected. If the selection signal is "10000", the light-emitting portion 405 is selected.

The selection signals 601 to 605 and a DATA (data) signal 606 are input into AND circuits 611 to 615. The outputs from the AND circuits 611 to 615 are connected to switches 621 to 625, respectively. The respective switches 621 to 625 turn current that flows from constant current sources 631 to 635 on and off in accordance with output from the corresponding AND circuits. For example, if the data signal is "1" and the selection signal is "00001", "1" is output from the AND circuit 611. Thereby, the switch 621 turns on, and current flows to the light-emitting portion 401 from the constant current source 631 such that the light-emitting portion 401 emits a laser light.

Figure 7:
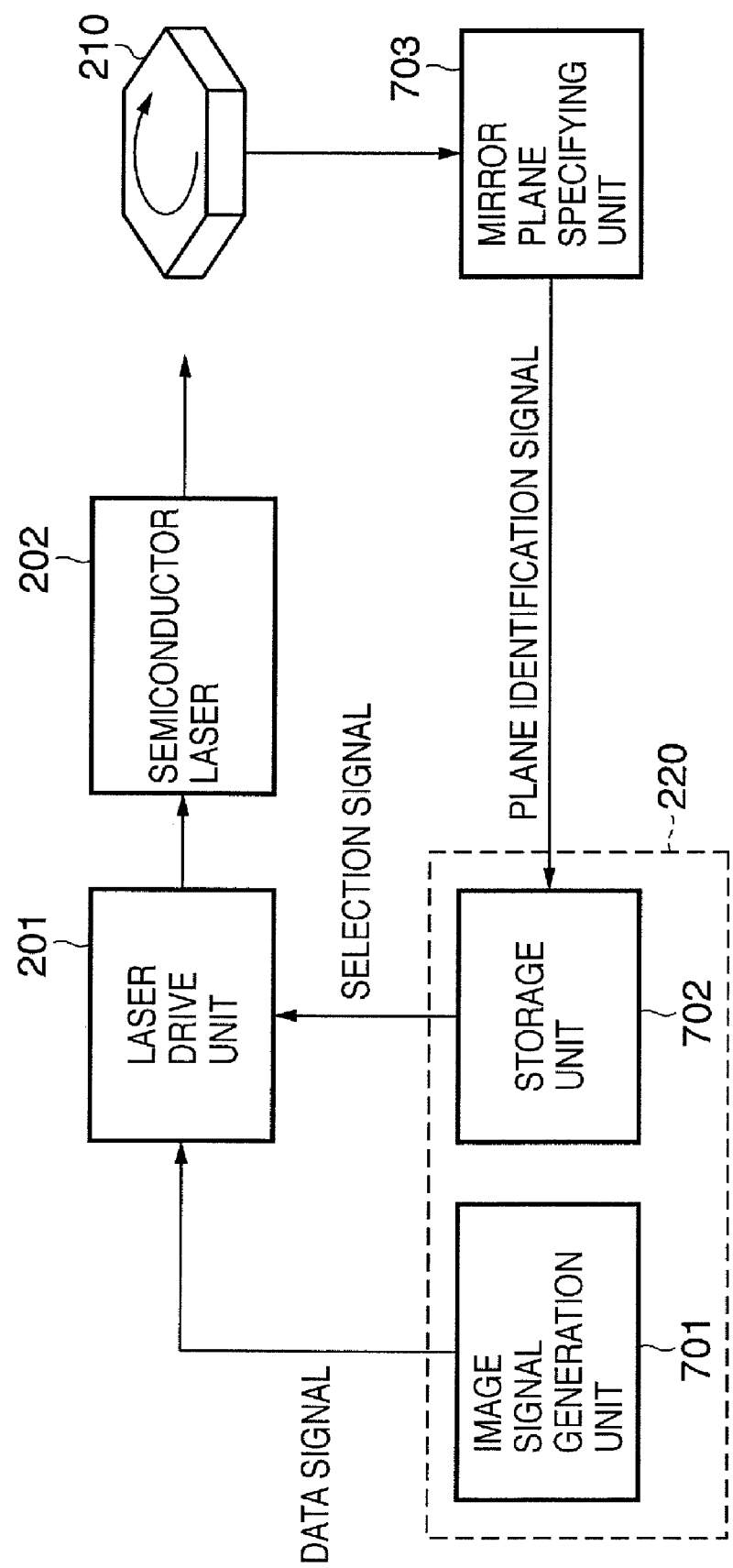
FIG. 7 is a view for describing a control mechanism according to the embodiments.

FIG. 7 is a view for describing a control mechanism according to the present embodiment. The main body controller 220 comprises an image signal generation unit 701 which generates the aforementioned data signal, a storage unit 702 which stores a relation between each mirror plane and the selection signals or a relation between the amount of plane tilt and the selection signals, and a mirror plane specifying unit 703 which detects and specifies the current mirror plane.

The mirror plane specifying unit 703 is adapted to output a plane identification signal that differs for each mirror plane. For example, a magnet is attached to the lower part of one mirror plane (for example, mirror plane A), and a Hall device is attached at a position which is at the lower part of the polygonal mirror 210 and which corresponds to the mirror plane at which a laser light will be irradiated. More specifically, a detection signal is output from the Hall device only when the mirror plane A reflects a laser light. Since the relationship between the mirror plane A and the other mirror planes is fixed, as long as it can detect just the mirror plane A, the mirror plane specifying unit 703 can specify the current mirror plane based on the rotational cycle of the polygonal mirror 210.

A plane identification signal that is output from the mirror plane specifying unit 703 consists of three bits. For example, when the mirror plane A is detected, "000" is output as the plane identification signal. When a laser light is reflected by the mirror plane B, "001" is output as the plane identification signal. When the laser light is reflected by the mirror plane C, "010" is output as the plane identification signal. When the laser light is reflected by the mirror plane D, "011" is output as the plane identification signal. When the laser light is reflected by the mirror plane E, "100" is output as the plane identification signal. When the laser light is reflected by the mirror plane F, "101" is output as the plane identification signal. The storage unit 702 outputs the five-bit selection signals 601 to 605 in accordance with this plane identification signal.

FIG. 8 is a view which illustrates one example of storage contents of a storage unit according to this embodiment. The plane identification signal functions as a readout address of the storage unit 702, and a selection signal that corresponds to the readout address is output from the storage unit 702. The relation (table) between the plane identification signals and the selection signals is, for example, set at the time of factory shipment. More specifically, at the factory that manufactures the image forming apparatus 100, the amount of plane tilt of each mirror plane of the polygonal mirror 210 is measured, and selection signals (light-emitting portions) that are effective for reducing the measured amount of plane tilt are determined. That is, light-emitting portions are determined that are suitable for decreasing position errors of spots that are attributable to the amount of plane tilt of the mirror plane. The correlation between each plane identification signal and each selection signal is then stored in the storage unit 702. Naturally, the selection signal corresponds substantially to the amount of plane tilt.

The storage unit 702 may also be adapted to store the amount of plane tilt for each mirror plane and to readout and output the amount of plane tilt in accordance with the plane identification signal. However, in this case, the laser drive unit 201 and the like must be adapted to select a light-emitting portion that is suitable for the amount of plane tilt that is read out from the storage unit 702. For example, a conversion unit for converting the amount of plane tilt into a selection signal will be required in the main body controller 220 or the laser drive unit 201.

Figure 9:
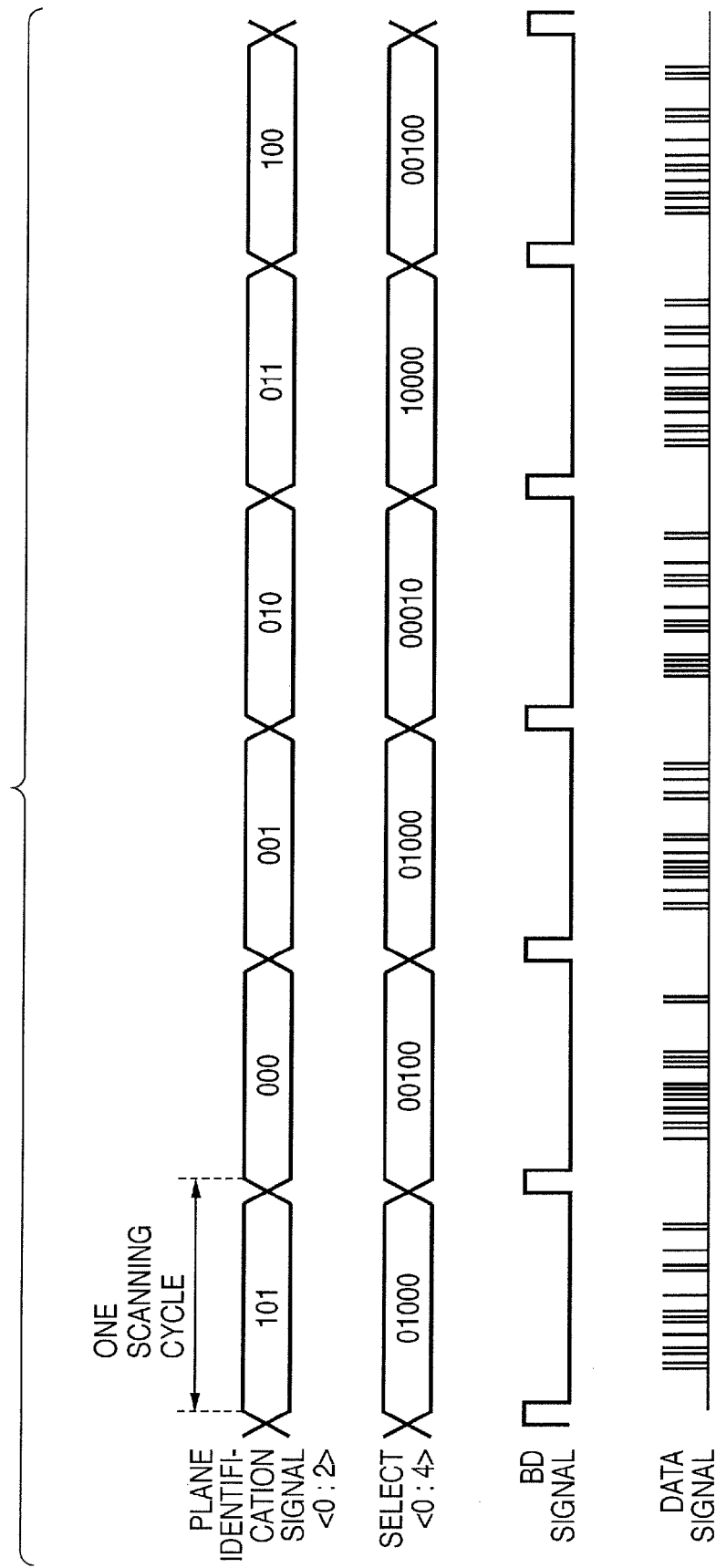
FIG. 9 is view which represents the relation between plane identification signals, selection signals, BD signals and data signals according to the embodiments.

FIG. 9 is view which represents the relation between plane identification signals, selection signals, BD signals and data signals according to this embodiment. As described above, a BD signal is a beam detection signal that is output from the beam detecting sensor 215. As can be understood from the figure, each time a BD signal is input, a selection signal is output from the storage unit 702 in a predetermined sequence.

Figure 10:
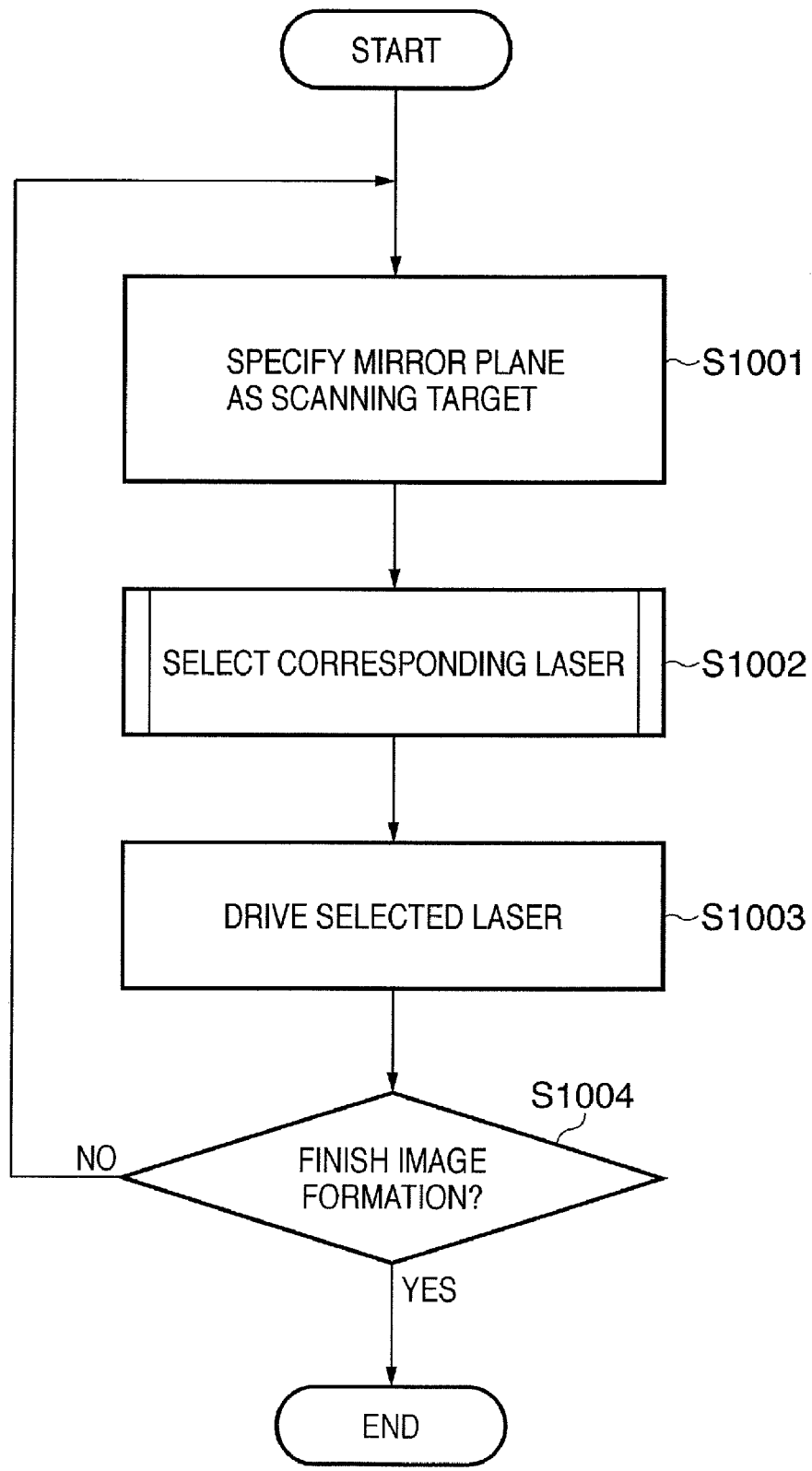
FIG. 10 is a flowchart which illustrates one example of a control method according to the embodiments.

FIG. 10 is a flowchart which illustrates one example of a control method according to this embodiment. In step S1001, the mirror plane specifying unit 703 specifies the current mirror plane to be used as the scanning target for scanning a beam. The mirror plane specifying unit 703 outputs a signal that is capable of specifying the current mirror plane (for example, a plane identification signal).

In step S1002, the storage unit 702 outputs a selection signal (SELECT signal) for selecting a light-emitting portion that is suitable for the current mirror plane to the laser drive unit 201. As described above, when a plane identification signal is input as a readout address, the storage unit 702 outputs a selection signal that is stored in correspondence with the address in question. The laser drive unit 201 switches the internal switches 621-625 in accordance with the selection signal.

In step S1003, the laser drive unit 201 causes a laser light to be emitted from the light-emitting portion that corresponds to the selection signal. In step S1004, the CPU of the main body controller 220 determines whether or not to end image formation. When image formation is not to be ended, the laser drive unit 201 selects a light-emitting portion that is suited to the next mirror plane in response to detection of the BD signal and causes that light-emitting portion to emit a light.

According to the present embodiment, using a simple configuration it is possible to correct pitch nonuniformity which is ascribable to a plane tilt of a polygonal mirror and provide a high definition image in which the reproducibility of each single dot is high. More specifically, according to the present invention, it is not necessary to add an optical component for eliminating a plane tilt, as is done in the conventional technology. Further, since one light-emitting portion is utilized for one dot, the reproducibility of dots is enhanced in comparison with the conventional technology in which one dot is formed by two light sources. It thus becomes easier to provide a high definition image.

In particular, since the laser drive unit 201 selects a light-emitting portion that is suitable for reducing a position error of a spot that is ascribable to the amount of plane tilt of the current mirror plane, various problems ascribable to plane tilts can be alleviated.

Further, means which calculates the amounts of plane tilt by previously storing a correlation between the amounts of plane tilt and the light-emitting portions in the storage unit 702 is not required. In this connection, by determining a light-emitting portion that is preferable for each mirror plane at the time of factory shipment, there will be essentially no necessity to determine the amount of plane tilt, and this method is preferable.

Second Embodiment

The first embodiment proposes previously determining the relation between the amount of plane tilt of each mirror plane and a light-emitting portion that is suitable for reducing the effect of the amount of plane tilt, and then using the light-emitting portion that is appropriate for the current mirror plane at the time of scanning.

However, on rare occasions, the amount of plane tilt of each mirror plane may change due to reasons that arise later. In this case, the relation between each mirror plane and the light-emitting portions that is determined at the time of factory shipment breaks down at least partly.

Therefore, the second embodiment proposes a method which selects a light-emitting portion that is suited to the current amount of plane tilt by measuring the amount of plane tilt of each mirror plane after factory shipment.

Figure 11:
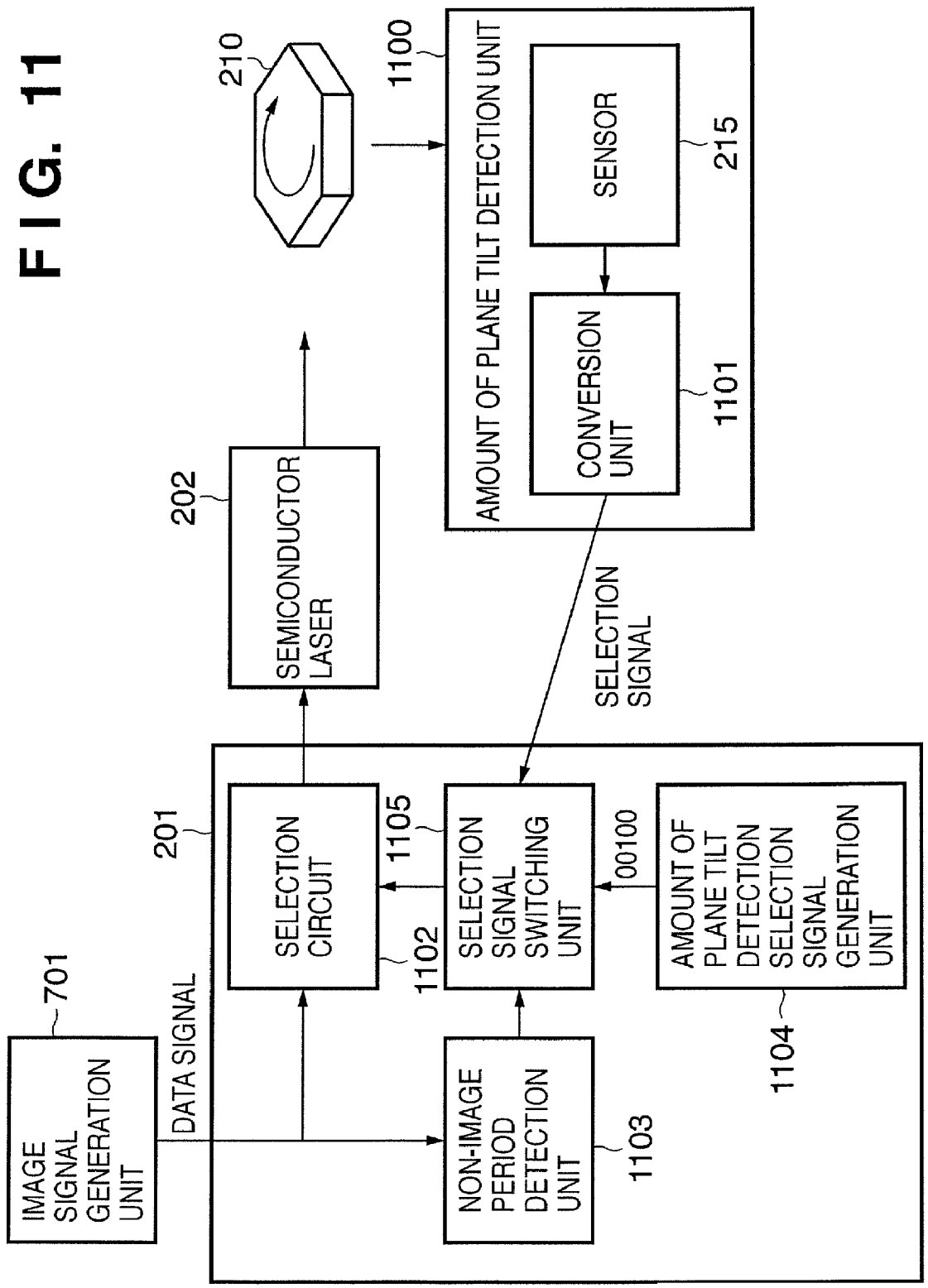
FIG. 11 is a view for describing another control mechanism according to the embodiments.

FIG. 11 is a view for describing another control mechanism according to this embodiment. In comparison to FIG. 7, an amount of plane tilt detection unit 1100 is employed in place of the mirror plane specifying unit 703 and the storage unit 702. The amount of plane tilt detection unit 1100 comprises a beam detecting sensor 215 and a signal conversion unit 1101 which converts a BD signal that is output from the beam detecting sensor 215 into an amount of plane tilt signal (selection signal).

Further, the laser drive unit 201 includes a selection circuit 1102 for the light-emitting portions shown in FIG. 6, a non-image period detection unit 1103, a selection signal generation unit 1104 for detecting an amount of plane tilt, and a selection signal switching unit 1105. The non-image period detection unit 1103 detects a non-image period in accordance with a data signal or the like, and notifies the selection signal switching unit 1105 that the period is a non-image period. The selection signal generation unit 1104 outputs a selection signal for selecting a light-emitting portion (for example, light-emitting portion 403) to be used for measuring the amount of plane tilt to the switching unit 1105. The selection signal switching unit 1105 outputs, in an image period, a selection signal for selecting a light-emitting portion that is suitable for reducing the amount of plane tilt, and on the other hand, in a non-image period, the selection signal switching unit 1105 outputs a selection signal for selecting a light-emitting portion to be used for measuring the amount of plane tilt.

In this connection, regarding the light-emitting portion that is used for measuring the amount of plane tilt, it is desirable to use the same light-emitting portion for all of the mirror planes. This is because, by only using the same light-emitting portion at all times, the amount of plane tilt can be determined by considering only the pulse width of a sensor output signal. However, in principle, it is also possible to determine the amount of plane tilt by using a different light-emitting portion each time. However, in this case, since it is not possible to determine the amount of plane tilt without also confirming which light-emitting portion is currently being used, the configuration of the amount of plane tilt detection unit 1100 will become relatively complicated.

Further, as the light-emitting portion for measuring the amount of plane tilt, it is preferable to use the center light-emitting portion 403 among the plurality of light-emitting portions. This is because of the fact that, if the light-emitting portion 405 at the lowermost edge is used, although it can correct an amount of plane tilt in units of +¼ pixel up to a maximum of 1 pixel in the plus direction, it cannot make a correction in the minus direction.

Figure 12:
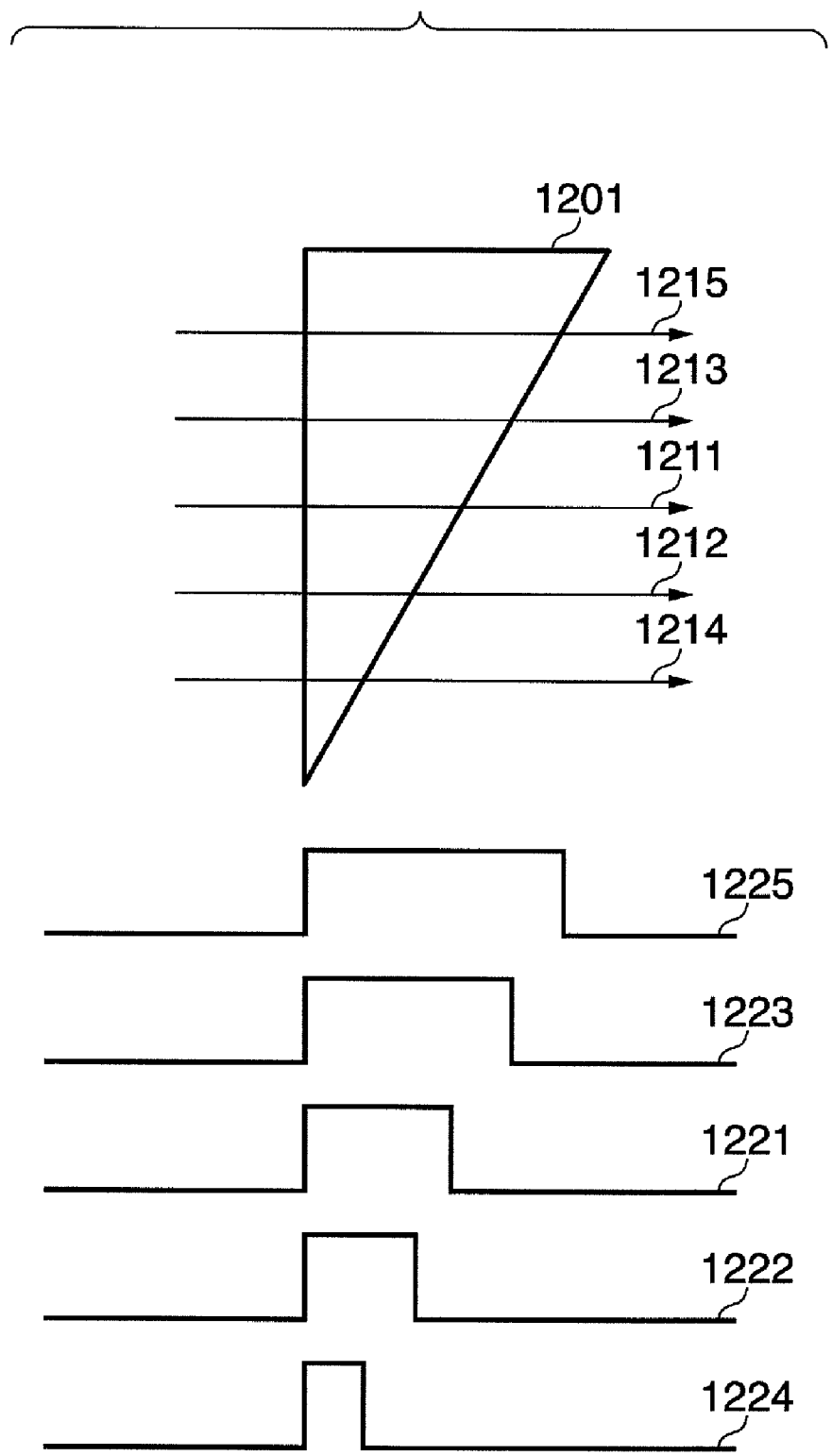
FIG. 12 is a view for describing the principle for determining the amount of plane tilt according to the embodiments.

FIG. 12 is a view for describing the principle for determining the amount of plane tilt according to this embodiment. Reference numeral 1201 denotes a light detection region of the beam detecting sensor 215. Although the beam detecting sensor 215 is generally used for deciding the writing timing in the main scanning direction of an image, in this case it is also used to detect the amount of plane tilt. In this connection, although a sensor for detecting the writing timing in the main scanning direction of an image and a sensor for measuring the amount of plane tilt may be provided as separate elements, it is preferable to combine these into a single sensor in order to reduce the number of components.

A scanning line 1211 represents the ideal scanning line (beam trajectory) when the amount of plane tilt is 0 pixels. A scanning line 1212 represents the trajectory of a beam when the amount of plane tilt is −¼ pixel. A scanning line 1213 represents the trajectory of a beam when the amount of plane tilt is +¼ pixel. A scanning line 1214 represents the trajectory of a beam when the amount of plane tilt is −½ pixel. A scanning line 1215 represents the trajectory of a beam when the amount of plane tilt is +½ pixel.

Reference numeral 1221 denotes a line representing a sensor output signal when the amount of plane tilt is 0 pixels. Reference numeral 1222 denotes a line representing a sensor output signal when the amount of plane tilt is −¼ pixel. Reference numeral 1223 denotes a line representing a sensor output signal when the amount of plane tilt is +¼ pixel. Reference numeral 1224 denotes a line representing a sensor output signal when the amount of plane tilt is −½ pixel.

Reference numeral 1225 denotes a line representing a sensor output signal when the amount of plane tilt is +½ pixel.

From the figure, it can be understood that the time which the beam traverses the light detection region 1201 (i.e. the pulse width) and the amount of plane tilt are related. The signal conversion unit 1101 outputs a selection signal that is in accordance with the pulse width (correlates with the amount of plane tilt) of the sensor output signal. In this connection, the signal conversion unit 1101 may be provided inside the laser drive unit 201.

FIG. 13 is a view which illustrates the correlation between amounts of plane tilt and selection signals according to this embodiment. As described above, the spot position of each light-emitting portion is as shown in FIG. 5. For example, if the amount of plane tilt is +½, it is preferable to select the light-emitting portion 405 for which the correction amount will be −½. In this connection, the signal conversion unit 1101 may hold a table in which the correlation between the amounts of plane tilt and the selection signals are recorded in the memory or the like.

Figure 14:
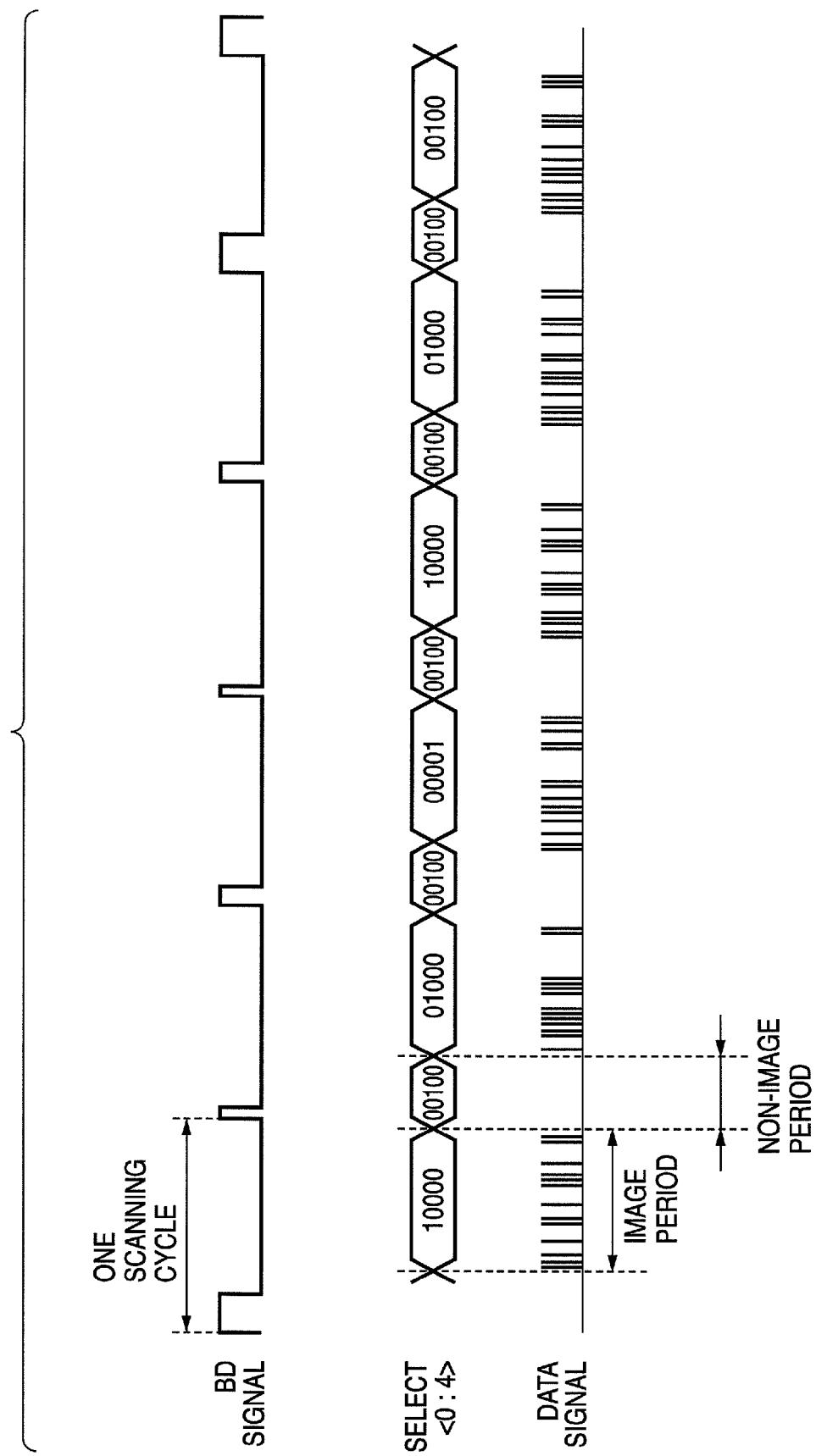
FIG. 14 is view which represents the relation between a BD signal, a selection signal, and a data signal according to the embodiments.

FIG. 14 is view which represents the relation between BD signals, selection signals, and data signals according to this embodiment. According to this figure, when the scanning cycle reaches a timing for detecting the amount of plane tilt (i.e. a non-image period), the switching unit 1105 inputs a selection signal "00100" from the selection signal generation unit 1104 into the selection circuit 1102. In contrast, in an image period, the switching unit 1105 inputs a selection signal corresponding to the amount of plane tilt (pulse width of BD signal) into the selection circuit 1102.

Figure 15:
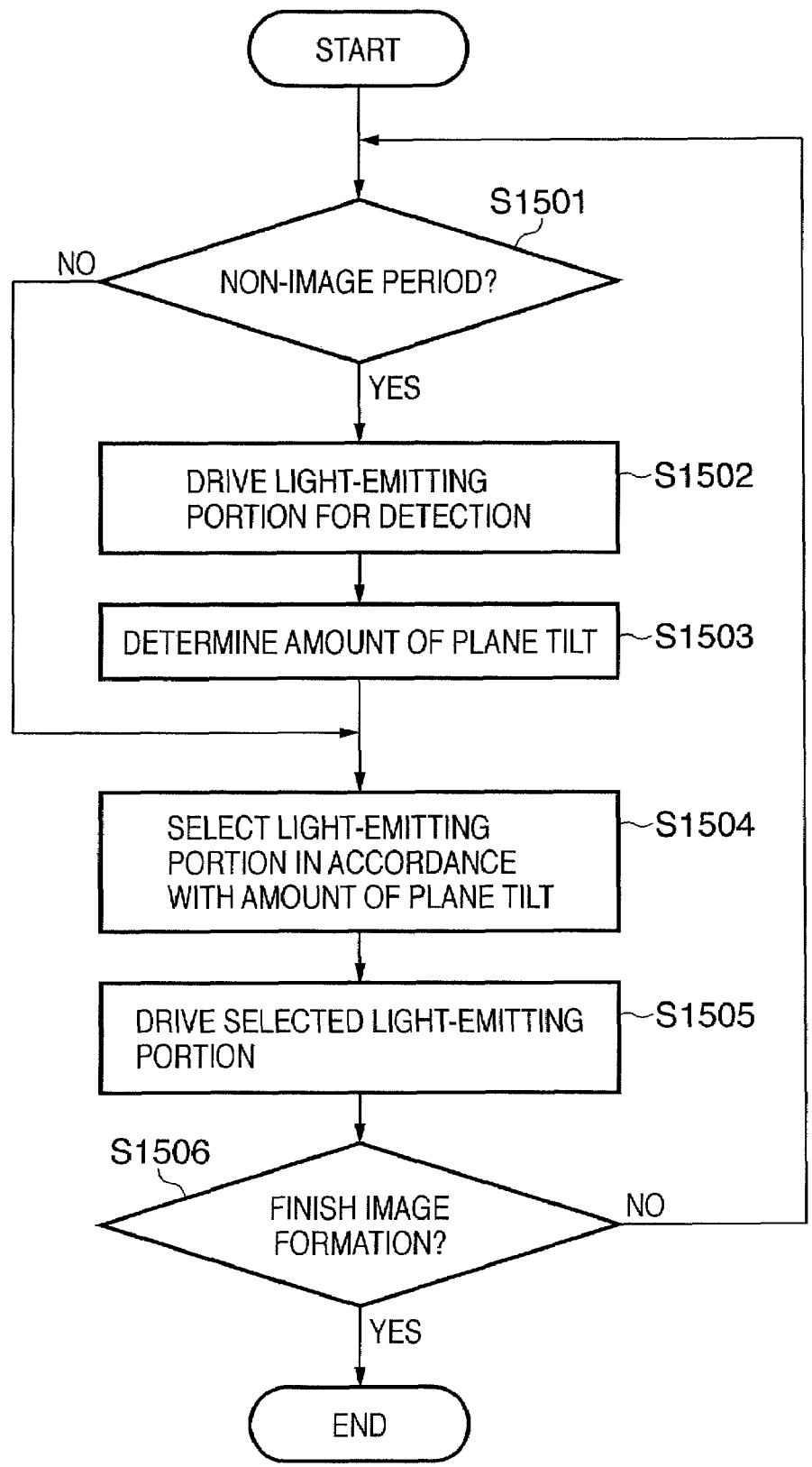
FIG. 15 is a flowchart which illustrates another example of a control method according to the embodiments.

FIG. 15 is a flowchart which illustrates another example of a control method according to this embodiment. In step S1501, the non-image period detection unit 1103 determines whether or not the scanning cycle is in a non-image period based on an image data signal or the like, and outputs the determination result to the selection signal switching unit 1105. If the scanning cycle is in a non-image period the operation proceeds to step S1502, and if it is in an image period the operation proceeds to step S1504.

In step S1502, the laser drive unit 201 drives a light-emitting portion for detection to emit a laser light. For example, upon receiving a detection result that indicates that the scanning cycle is in a non-image period, the selection signal switching unit 1105 outputs a selection signal from the selection signal generation unit 1104 to the selection circuit 1102. The selection circuit 1102 causes the center light-emitting portion 403 to emit a laser light based on the selection signal.

In step S1503, the amount of plane tilt detection unit 1100 determines the amount of plane tilt. For example, the beam detecting sensor 215 of the amount of plane tilt detection unit 1100 outputs a sensor detection signal corresponding to the time (pulse width) the beam was detected to the signal conversion unit 1101.

In step S1504, the laser drive unit 201 selects a light-emitting portion according to the amount of plane tilt. For example, the signal conversion unit 1101 outputs a selection signal corresponding to the sensor detection signal's pulse width (amount of plane tilt) to the switching unit 1105. In the case of an image period, the switching unit 1105 outputs a selection signal that is input from the signal conversion unit 1101 to the selection circuit 1102. Based on the selection signal, the selection circuit 1102 selects a light-emitting portion that is suitable for reducing the amount of plane tilt.

In step S1505, the laser drive unit 201 drives the selected light-emitting portion to emit a laser light. In step S1506, the main body controller 220 decides whether or not to end the image formation. When the main body controller 220 decides not to end image formation, the operation returns to step S1501.

According to the present embodiment, by forming an image using a light-emitting portion that is suitable to the measured amount of plane tilt, it is possible to correct pitch nonuniformity that is ascribable to a plane tilt of the polygonal mirror to provide a high definition image in which the reproducibility of each single dot is high. In particular, according to the present embodiment, even when an amount of plane tilt measured at the time of factory shipment changes to another value for reasons that arise after shipment, it is possible to use a light-emitting portion that is suitable for the current amount of plane tilt.

Other Embodiments

Although according to the above described embodiments, the scanning apparatus 101 was described as an apparatus that is built into the image forming apparatus 100, the scanning apparatus 101 may also be used for another purpose. In that case, the scanning apparatus 101 may expose while scanning on a desired exposure plane, and not on a photosensitive member.

According to the present invention, using a simple configuration it is possible to correct pitch nonuniformity which is ascribable to a plane tilt of a polygonal mirror and provide a high definition image in which the reproducibility of each single dot is high.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-110103, filed on Apr. 12, 2006, which is hereby incorporated by reference herein in its entirety.

What is claimed is:

1. An image forming apparatus, comprising:
    an image carrier member;
    a light source having a plurality of light-emitting portions, each of which emits a light beam based on input image data;
    a rotating polygonal mirror having a plurality of mirror planes each of which deflects and scans the light beams emitted from said light source to form a plurality of scanning lines on said image carrier member, wherein each of the mirror planes has an associated amount of plane tilt that causes the light beam to be offset from the desired location on the image carrier member by the amount of plane tilt;
    a control unit which selects, for each of the mirror planes, a corresponding light-emitting portion based on the amount of plane tilt, whereby the offset of the spot of the light beam from the light source on the image carrier member caused by the plane tilt of the mirror plane is reduced by the offset associated with the spot generated by the selected corresponding light-emitting portion; and
    a driving unit which drives said light source according to image data so as to emit the light beam only from the light-emitting portion selected for each of the mirror planes.

2. The image forming apparatus according to claim 1, wherein said control unit is configured to select any one of said light-emitting portions being appropriate to reduce location error of spot formed on said image carrier member by the light beam, the location error of spot being occurred due to the amounts of plane tilt each of which the plurality of mirror planes have.

3. The image forming apparatus according to claim 1, further comprising:
   a storage unit which stores the amounts of plane tilt each of which corresponds to one of the mirror planes of said rotating polygonal mirror; and
   a mirror plane specifying unit which specifies a mirror plane from among the plurality of mirror planes which deflects the light beam emitted from said light source;
   wherein said control unit is configured to read out from said storage unit an amount of plane tilt which corresponds to the specified mirror plane and to select any one of the light-emitting portions based on the read out amount of plane tilt.

4. The image forming apparatus according to claim 1, further comprising:
   an amount of plane tilt detection unit which detects amounts of plane tilt each of which corresponds to one of the mirror planes;
   wherein said control unit is configured to select any one of the light-emitting portions in accordance with the detected amount of plane tilt.

5. The image forming apparatus according to claim 4, wherein said amount of plane tilt detection unit includes:
   a light beam detection unit which outputs a detection signal when detects a light beam that is emitted from said light source and deflected by any one of the mirror planes; and
   a determining unit which determines the amount of plane tilt in accordance with a pulse width of the detection signal.

6. The image forming apparatus according to claim 4, wherein said control unit is configured to cause a single light-emitting portion from among the plurality of light-emitting portions to emit a light beam while said amount of plane tilt detection unit detects the amount of plane tilt.

7. The image forming apparatus according to claim 4, wherein said control unit is configured to cause a center light-emitting portion being positioned at a center of the plurality of light-emitting portions to emit a light beam while said amount of plane tilt detection unit detects the amount of plane tilt.

8. The image forming apparatus according to claim 1, wherein at least four light-emitting portions are located within the width of the one line.

9. The image forming apparatus according to claim 1, wherein distance between the adjacent light-emitting portions are less than half of the width of the one line.

10. A method of controlling an image forming apparatus which comprises an image carrier member; a light source having a plurality of light-emitting portions, each of which emits a light beam based on input image data; a rotating polygonal mirror having a plurality of mirror planes each of which deflects and scans the light beams emitted from said light source to form a plurality of scanning lines on said image carrier member, wherein each of the mirror planes has an associated amount of plane tilt that causes the light beam to be offset from the desired location on the image carrier member by the amount of plane tilt, the method comprising the steps of:
    outputting a selection signal by a storage unit which stores the amounts of plane tilt each of which corresponds to one of the mirror planes of said rotating polygonal mirror, wherein the amount of plane tilt is an amount of tilt of the mirror plane to rotation axis of said rotating polygonal mirror;
    selecting, for each of the mirror planes, a corresponding light-emitting portion based on the amount of plane tilt, whereby the offset of the spot of the light beam from the light source on the image carrier member caused by the plane tilt of the mirror plane is reduced by the offset associated with the spot generated by the selected corresponding light-emitting portion; and
    driving said light source according to image data so as to emit the light beam only from the light-emitting portion selected for each of the mirror planes.

11. The method according to claim 10, wherein the step of selecting further comprises a step of choosing any one of said light-emitting portions being appropriate to reduce location error of spot formed on said image carrier member by the light beam, the location error of spot being occurred due to the amounts of plane tilt each of which the plurality of mirror planes have.

12. The method according to claim 10, further comprising the steps of:
    detecting amounts of plane tilt each of which corresponds to one of the mirror planes; and
    storing the detected amounts of plane tilt into said storing unit.

* * * * *